June 27, 1967  R. GOODACRE  3,327,875
LIFT TRUCK HAVING BATTERY REMOVAL APPARATUS
Filed June 22, 1965  5 Sheets-Sheet 1
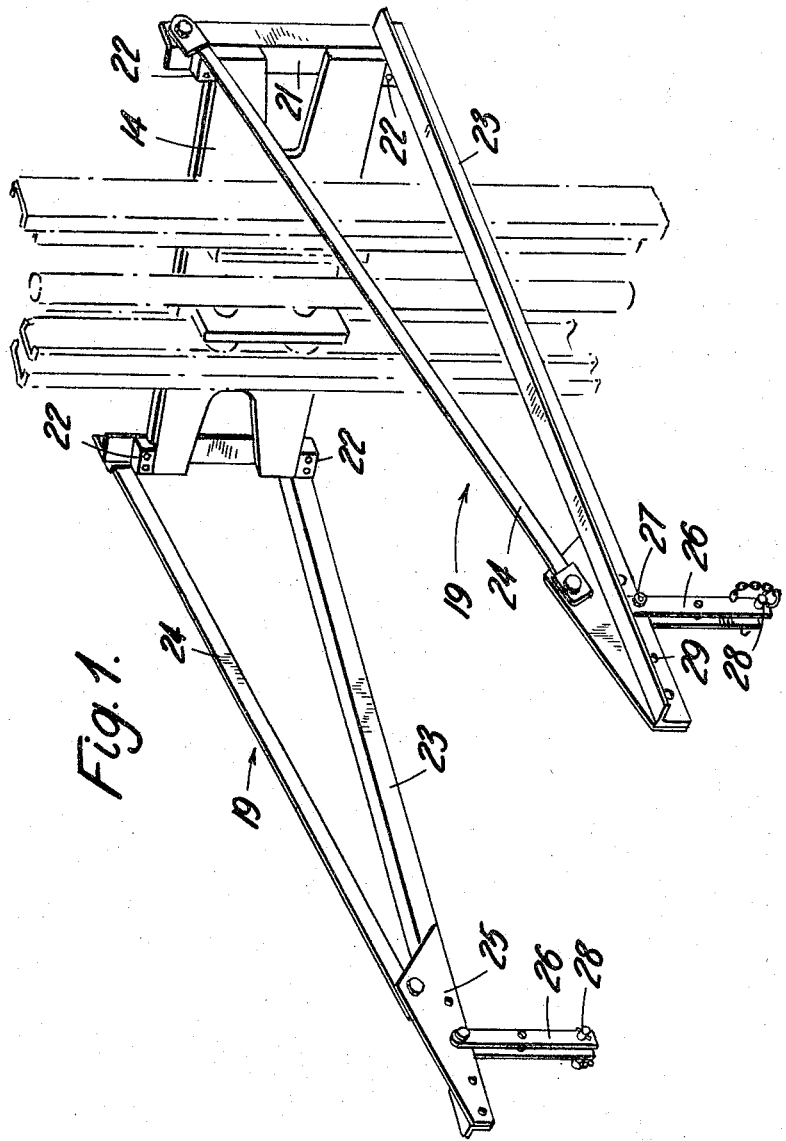

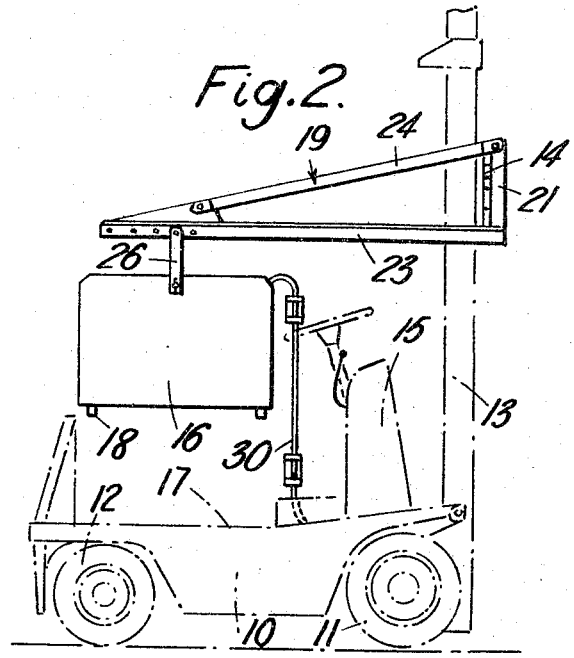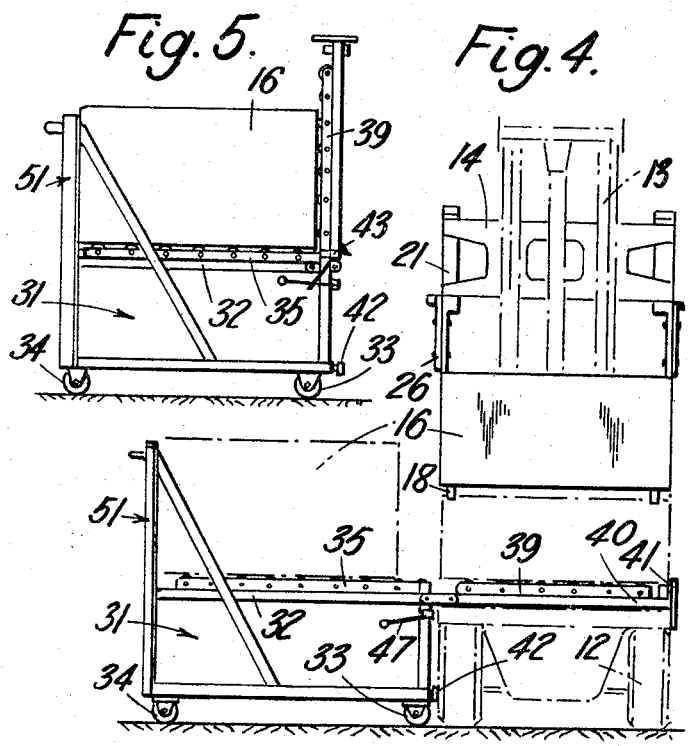

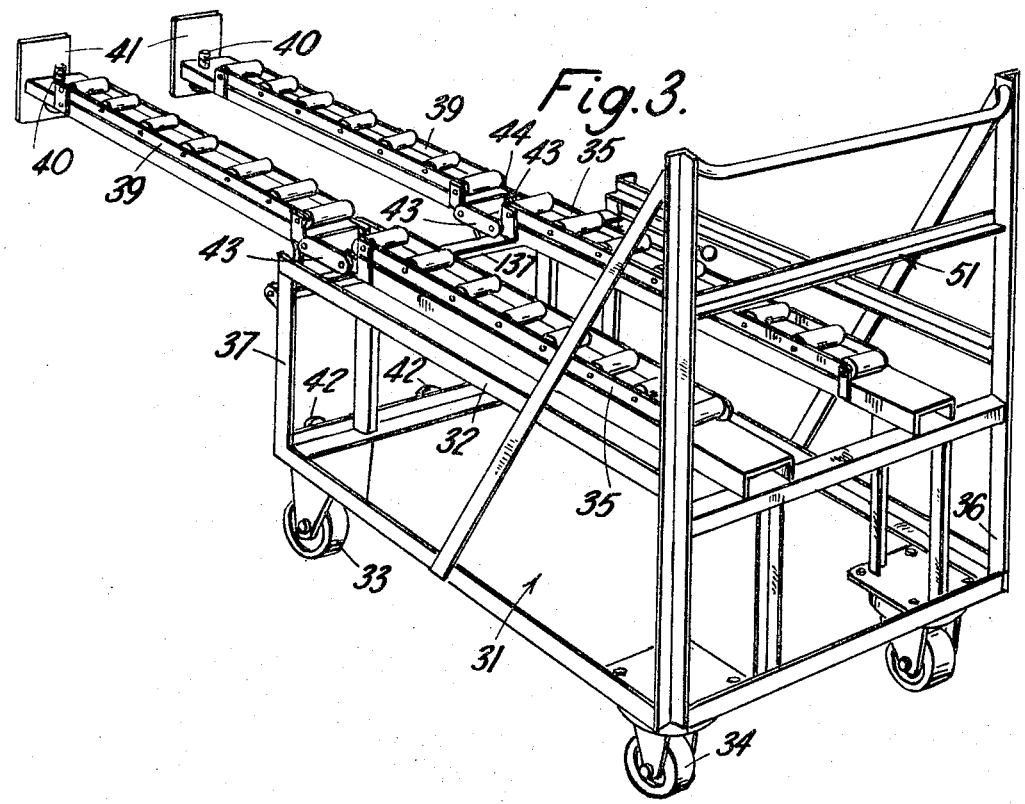

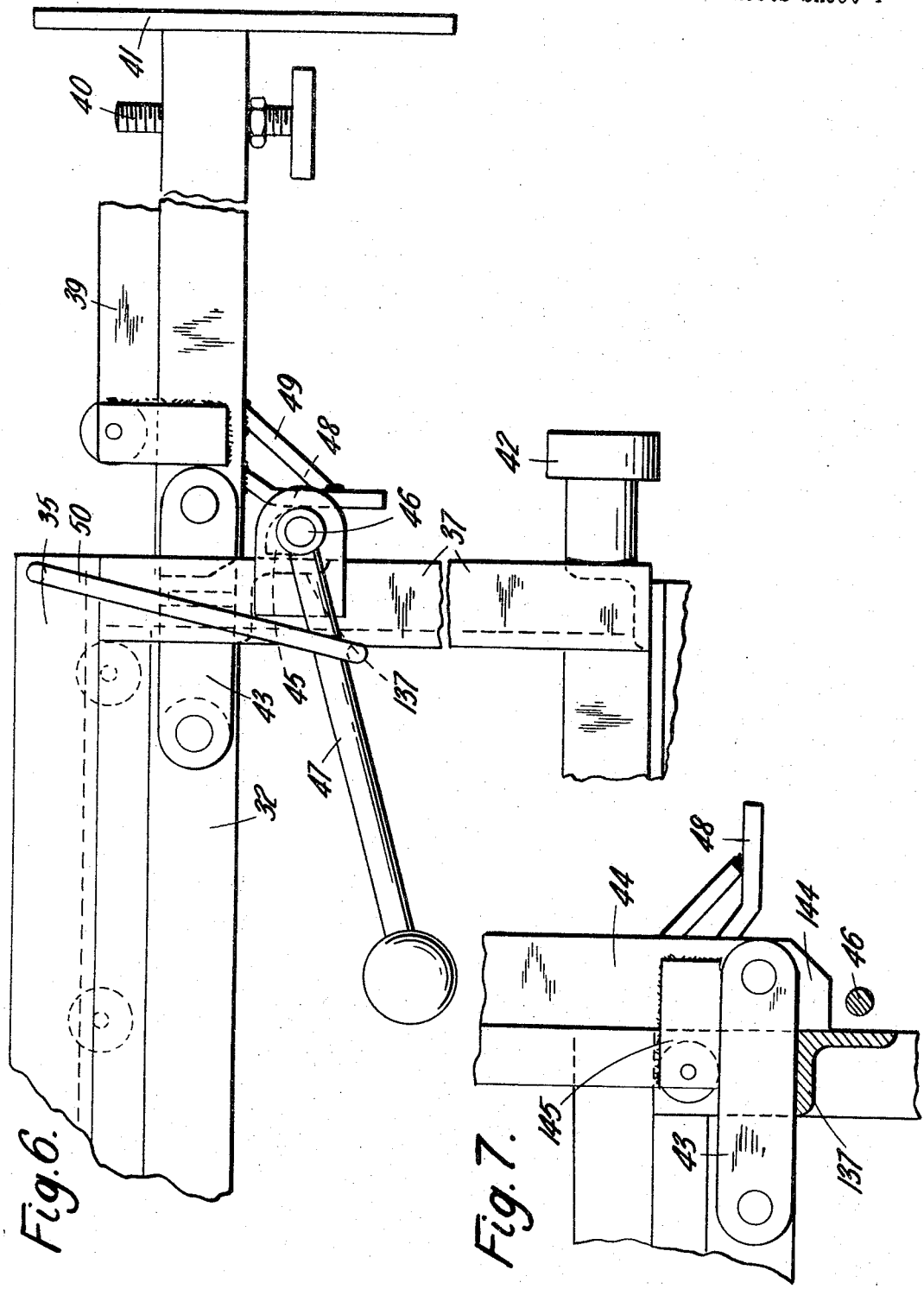

United States Patent Office 3,327,875
Patented June 27, 1967

3,327,875
LIFT TRUCK HAVING BATTERY REMOVAL APPARATUS
Ronald Goodacre, Basingstoke, England, assignor to Lansing Bagnall Limited, Basingstoke, England, a British company
Filed June 22, 1965, Ser. No. 465,988
Claims priority, application Great Britain, June 30, 1964, 27,047/64
6 Claims. (Cl. 214—38)

This invention comprises improvements in or relating to electric battery-driven lift trucks.

The invention relates to the removal and replacement of batteries on electric battery-driven lift trucks of the type (hereinafter referred to as "the type described") in which the battery rests on a part of the truck which allows it to be freely lifted, the battery extends across the truck and there is an upwardly and downwardly movable load-lifting part, such as, for example, a load-lifting carriage on a vertical guide or mast, to which carriage fork arms or the like can be attached.

According to the invention, battery handling equipment comprises a battery-lifting attachment for a truck of the type described comprising at least one bracket adapted to be mounted detachably on the load-lifting part of the truck so that it is restrained against swinging relatively thereto, an arm on the bracket shaped to extend towards the truck battery and means on the arm to engage the battery and to lift it when the load-lifting part is raised.

When the truck has a load-lifting carriage as described above, there may conveniently be two brackets which are shaped so as to fit the top and bottom edges of the carriage and to be slid thereon one from each side.

The invention also includes battery handling equipment comprising in combination a battery-lifting attachment as described above and removable supporting means capable of being entered below the battery when the battery is lifted and to support the battery when the load-lifting part is lowered to deposit the battery on the supporting means, which means are then capable of being moved to remove the battery laterally from the truck.

The said supporting means preferably comprise one or more wheeled trolleys which may be entered below the battery when the battery is lifted such that the or each trolley lies across the truck and which, after the battery has been deposited thereon, may be rolled laterally from the truck on to a supporting surface, e.g. the platform of a battery-charging station.

The invention further includes battery handling equipment comprising in combination a battery-lifting attachment as described above and a wheeled trolley having a fixed or detachable extension projecting from it capable of being entered below the battery when the latter is lifted and to support the battery when the load-lifting part is lowered to deposit the battery upon it. The trolley may conveniently carry on its upper surface, and on the upper surface of the extension, roller conveyor means to enable the battery to be rolled off the bracket to a position above the trolley wheels.

Preferably the extension is pivotally connected to the trolley.

It is also preferred that the extension, when entered below the battery is supported by the battery support part of the truck. The extension may also be provided with adjustable feet to rest on the battery support part of the truck when the extension is entered below the battery.

The free end of the extension may be provided with downwardly projecting elements to engage the far side of the battery support part of the truck when the extension has been entered below the battery, and thereby prevent reverse movement of the extension.

The forward end of the trolley is preferably provided with buffer elements to engage the near side of the battery support of the truck when the extension has been entered below the battery to prevent further forward movement of the extension.

In the case in which the extension is pivotally connected to the trolley, means is preferably provided for raising the extension above its position projecting from the trolley whereby the lower ends of the downwardly projecting elements may be held above the level of the battery support part of the truck until the extension has been entered below the battery. This raising means for the extension may comprise a cam or cams on the trolley that may be rotated to engage and deflect a part of, or a member attached in fixed relation to, the extension whereby the extension is raised the predetermined amount.

The extension may also be constructed such that it can be raised into a vertical position and retained in this position to prevent the battery sliding off the trolley when it is supported thereon.

By way of example, two constructions of battery handling equipment in accordance with the invention will now be described with reference to the accompanying drawings in which:

FIGURE 1 is a perspective view of the battery lifting attachment attached to the lifting carriage of the truck;

FIGURE 2 is a side view of the attachment shown in FIGURE 1 attached to a battery, the figure showing the attachment having lifted the battery off the battery support part of the truck;

FIGURE 3 is a perspective view of a wheeled trolley on to which the battery may be deposited;

FIGURE 4 is a rear view of the truck with the battery lifted off the support part as in FIGURE 2 and with the extension of the wheeled trolley shown in FIGURE 3 entered below the battery;

FIGURE 5 is a side view of the trolley shown in FIGURE 3 with the battery on the trolley and with the extension raised into a vertical position;

FIGURE 6 is a side view of the raising means for the extension, whereby the free end of the extension may be raised a predetermined amount above the battery support part of the truck;

FIGURE 7 is a view, partly in section, of a part of the trolley as shown in FIGURE 6 and shows the extension raised into a vertical position and the means for retaining the extension in that position.

Figure 8:
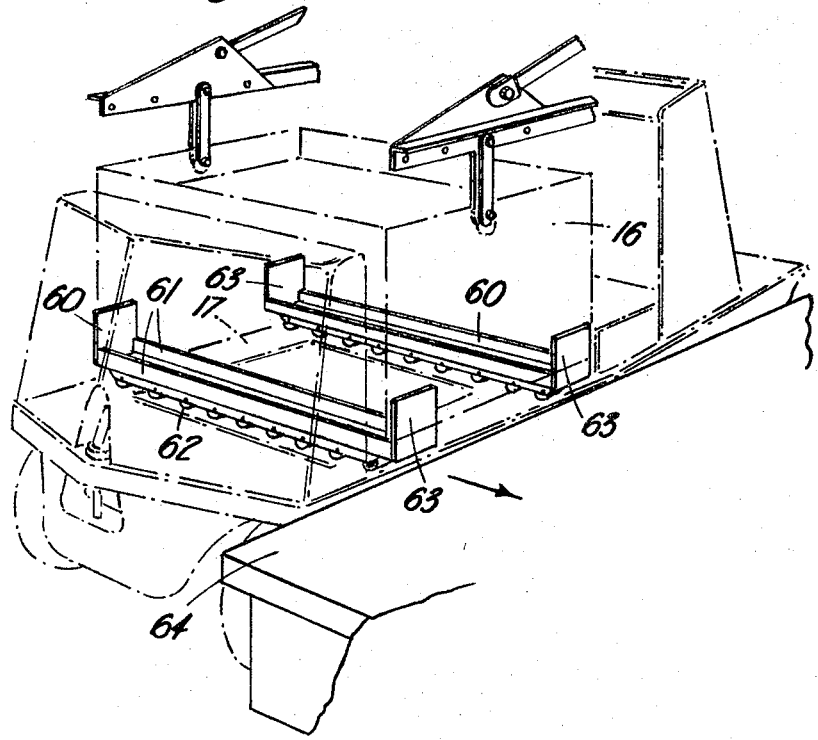
FIGURE 8 is a perspective view of a second construction showing equipment for removal of the battery directly on to the platform of a battery charging station.

With reference to the drawings, there is provided a fork-lift truck comprising a chassis 10 supported from the ground by a pair of front wheels 11, which are driven through drive connections from an electric motor (not shown) and by a pair of steerable rear wheels 12. At the front end of the truck there is an upright extensible mast 13 on which a load-lifting carriage 14 is mounted for up-and-down movement and controls 15 for controlling movements of the truck and of the mast and carriage are located behind the mast.

Rearwardly of the controls 15 there is an electric storage battery fitted in an oblong box 16 which extends across the truck from side to side and on which is removably mounted a cover (not shown) carrying an operator's seat. The battery-box 16 rests on two side support members, one at each side of the truck, which extend in a fore-and-aft direction, and a cross support member extending between the two side members which support members comprise the battery support 17 of the truck. The battery-box is thus free to be lifted. The two side members each have a socket (not shown) at each end into which sockets project associated downwardly projecting spigots 18 on the underside of the battery-box so that the battery-box is located relatively to the support members. If desired, sockets may also be provided in the cross support member and corresponding spigots provided on the underside of the battery-box.

The electric driving motor is mounted on the chassis beneath the battery-box and is exposed when the battery-box is removed.

The load-lifting carriage 14 on the mast extends transversely to the fore-and-aft axis of the truck and on which a pair of load-engaging fork arms (not shown) are mounted to project forwardly therefrom, the fork arms being spaced from the ends of the carriage in the transverse direction.

An attachment (see especially FIGURES 1, 2 and 4) is provided for the above-described truck to enable the battery-box 16 to be lifted when the carriage 14 of the truck is raised. Such lifting of the battery-box 16 is necessary for removal and replacement of the battery-box and also by exposing the driving motor facilitates servicing of the latter.

The attachment comprises two brackets 19 which are adapted to be fitted on to the load-lifting carriage 14 and which have arms which extend towards the battery-box when the brackets 19 are fitted on the carriage. Each bracket 19 comprises a steel saddle member 21 of length greater than the height of the upright carriage and two L-shaped lugs 22 mounted on the saddle member 21 one at each end so that one will fit on the top edge of the backplate and the other on the bottom edge. The brackets 19 can thus be slid on to the carriage one from each side in a horizontal direction, the saddle members 21 being upright.

The arms on the brackets 19 each consist of an angle member 23 bolted at one end to the lower end of the saddle member 21, that is to say the end of the saddle member which is lowermost when it is fitted on the backplate, and a flat tie strip 24 extending between a plate 25 fixed to the end of the angle member 23 remote from the saddle member and the upper end of the saddle member. The length of the tie strip 24 is such that the angle member 23 is at right angles to the saddle member 21 and is therefore substantially horizontal when the bracket 19 is on the carriage 14.

At the end of the angle member 23 remote from the saddle member, battery-box engaging means are provided. These means comprise a shackle 26 consisting of two short strips connected together by a bolt 27 passing through a hole 29 in the angle member and a second bolt 28 to pass successively through one of the strips, a hole in the side of the battery-box 16 near the upper edge thereof and the other strip. The angle member 23 is provided with several holes 29 to permit adjustment of the position of the shackle along the length of the angle member according to the distance between the back-plate and the battery-box.

The sequence of operation in using the attachment to lift the battery-box is as follows. The cover and operator's seat are removed from the battery-box 16, the carriage 14 is raised to a position in which its lower edge is above the level of the top of the battery-box, the two brackets 19 are slid one from each side on to the carriage so that the arms project rearwardly from the carriage and the shackles 26 are connected to the battery-box. The carriage is then raised so that the battery-box is lifted to the desired extent.

It will be appreciated that in order to permit this lifting of the battery-box 16 using the power from the battery itself, there must be sufficient length of cable 30 between the battery and the control circuit. If desired, a short length of cable may be provided for insertion between the battery and the control circuit.

It will also be appreciated that when the attachment is fitted an operator might encounter some difficulty in operating the carriage-lift control lever. To facilitate operation of this lever there may be provided a rod (not shown) having a socket at one end to fit over the lever by means of which rod an operator can manipulate the lever from the rear end of the truck.

There is also provided for use in combination with the above-described attachment a wheeled trolley 31 (see especially FIGURES 3 to 6) to enable the battery-box 16 to be removed from the truck. The trolley comprises a horizontal framework 32 supported from the ground by a pair of wheels 33 and also a back pair of caster wheels 34, the wheels 34 being capable of rotating through 360° with respect to the framework 32. On the upper surface of the framework are two parallel roller conveyors 35 extending lengthwise of the trolley from adjacent the rear 36 to the front 37 of the framework of the trolley. Each length of conveyor 35 is also provided with an extending conveyor portion 39 projecting from the front 37 of the framework of the trolley at the same height as the conveyors 35. These portions 39 thereby provide an extension of the trolley for entering under the battery-box when it has been lifted off the battery support part 17 of the truck by the attachment described above. The height of these conveyor portions 39 is such that by means of feet 40 provided at the front end of the portions 39, the portions, when entered under the battery-box can be supported by the part 17 of the truck (see FIGURE 4). The feet 40 are also adjustable in height.

The front end of each of the projecting conveyor portions 39 is also provided with a plate 41 projecting downwardly from the conveyor portion for location with the far side of the part 17 of the truck (see FIGURE 4) thereby preventing reverse movement of the trolley after the portions 39 have been entered below the battery. Also to prevent further forward movement when the portions 39 are in this position, the front 37 of the framework of the trolley is provided with three buffer elements 42.

With reference to FIGURE 3, it will be seen that the projecting conveyor portions 39 are separate from the conveyors 35 and are coupled thereto by links 43 pivotally attached at one end to the conveyors 35 and pivotally attached at the other end to the conveyors 39. The conveyors 39 may thus be lifted from their normal horizontal position to a vertical posiiton as shown in FIGURE 5 and in chain lines in FIGURE 6, in which position the end 44 of each conveyor 39 is supported by the links 43 resting on an upper cross member 137 at the front of the trolley. The conveyor 39 is locked in its vertical position by the projecting portions 144 of the conveyor engaging the front face of the cross member 137 and by further projections 145 engaging the upper surfaces of the links 43. In addition, means are provided whereby the conveyors 39 may be raised a small part of the aforesaid movement relative to the conveyors 35, this small movement being necessary to raise the lower end of each plate 41 above the level of the battery support part 17 of the truck so that the conveyors 39 may be entered below the battery. These raising means are shown in detail in FIGURE 6 and comprise a pair of cams 45, one for each projecting conveying portion 39. The cams 45 are mounted on a bar 46 attached to the front 37 of the framework of the trolley and a handle 47 is also mounted on the bar 46 whereby the bar can be rotated. On rotation of the bar by lifitng the bar, each cam, when viewed in FIGURE 6, will be rotated in a clockwise direction into engagement with a lug 48 projecting downwardly from the conveyor portion 39. Each lug 48 is also provided with a supporting lug 49. Rotation of the cams will thus effect raising of the conveyor portions 39, the amount of lift being such that the portions 39 can be entered beneath the lifted battery-box. Reverse rotation of the bar will allow the portions 39 to return to their horizontal position. A U-shaped member 50 is provided to restrict movement of the handle 47 in both an upward and a downward direction. The lugs 48, 49 also prevent the conveyors 39 from dropping below their normal horizontal position.

After the conveyors 39 have been thus entered beneath the battery-box 16 and lowered on to the battery support part 17 of the truck, the carriage 14 is lowered to deposit the battery-box on the conveyors 39, the shackles are unhitched from the battery-box, the battery is disconnected from the control circuit and the battery-box is rolled on the conveyors to a position above the wheels 33, 34 of the trolley. To prevent the battery-box running off the trolley, the rear part 36 of the framework provides a stop 51 and the conveyor portions 39 are lifted and locked in their vertical position. (See FIGURE 5).

Once the battery-box is on the trolley, the latter can be wheeled to a battery-charging station for the battery to be charged. After charging, the battery-box is replaced by reversing the removal operation. If it is desired to use the truck in the meantime, a previously charged battery in a like battery-box already on a like trolley can be placed on the truck.

In an alternative construction of the trolley, there are no projecting portions of the conveyors. Instead, two separate lengths of roller conveyors are provided for attachment between the truck and the trolley in alignment with the conveyors on the trolley. Preferably, the trolley has socketed brackets to receive corresponding spigots on the conveyor lengths and the conveyor lengths are also provided with spigots to engage the sockets in the battery-box supporting members of the truck. In this way, when the separate conveyor lengths are fitted to the truck and the trolley, the latter is restrained against rolling away from the truck as the battery-box is removed.

With reference to FIGURE 8, the wheeled trolley described above is replaced by a pair of wheeled trolleys 60 which are entered below the battery after it has been lifted and located across the battery support part 17 of the truck. Each trolley comprises a pair of longitudinal bars 61, which are the same length as the battery and form the platform of the trolley, which bars are raised above the level of the battery support part 17 of the truck by a plurality of rollers 62. At either end of the pair of bars 61 is a vertical stop plate 63 to stop the battery slipping off the trolleys when it has been deposited thereon. The battery may then be removed from the truck by moving the wheeled trolleys laterally on to the platform 64 of a battery-charging station.

The wheeled trolleys 60 may be entered below the battery and then the battery deposited thereon, as shown in FIGURE 8, or alternatively the wheeled trolleys may be inverted with the rollers 62 uppermost and with the plates 63 engaging the sides of the battery support part 17 of the truck. The rollers 62 would then comprise a roller conveyor along which the battery can be moved.

On occasions, it may be desired to service the driving motor of the above-described truck without removing the battery-box from the truck. In order to permit this, the battery-box may be lifted as described above to expose the motor. To ensure that the battery-box may not accidently drop, support legs for the battery-box are provided. Each leg comprises a length of tube provided with a radial flange near one end and, with the battery-box raised, these legs are inserted in the sockets in the battery-box support members so that their radial flanges engage the support members. The battery-box is then lowered so that its downwardly-projecting spigots enter the tops of the tubular legs. In this way, the battery-box is safely supported.

I claim:

1. In a battery driven truck of the kind having in combination a chassis, a mast mounted on the chassis, an electrically driven load-lifting carriage slidable up and down the mast, a storage battery for operating the carriage, which battery is located on and supported by the truck chassis behind the mast with respect to the carriage and is accessible from the top and at least one side of the chassis, the combination therewith of a pair of lifting brackets detachably fixed to the carriage, both brackets extending towards the battery and being detachably secured thereto whereby when the carriage is raised the battery is raised therewith, and a battery carrier inserted beneath the raised battery, which carrier is movable laterally from the truck, with the battery, when the battery has been lowered on to the carrier.

2. A truck as claimed in claim 1 in which the battery carrier comprises at least one wheeled trolley which is inserted between the raised battery and the chassis and which is movable, with the battery, laterally from the chassis on to a supporting surface when the battery has been lowered on to the trolley.

3. A truck as claimed in claim 1 in which the battery carrier is a trolley having ground wheels and an extension projecting from the trolley, which extension is inserted beneath the raised battery and forms a continuous supporting face along which the battery is moved to a position above the trolley wheels when the battery has been lowered on to the said extension.

4. A truck as claimed in claim 3 in which the trolley carries on its upper surface and on the upper surface of the extension, roller conveyor means to enable the battery to be rolled off the extension to a position above the trolley wheels.

5. A truck as claimed in claim 3 in which the free end of the extension is provided with downwardly projecting plates which engage the far side of the chassis of the truck.

6. A truck as claimed in claim 5 in which the extension is pivotally connected to the trolley and in which the extension is pivotable by cam means to position the lower ends of the downwardly projecting plates above the level of the chassis of the truck.

References Cited

UNITED STATES PATENTS

| 2,386,759 | 10/1945 | Ulm | 214—620 |
| 2,823,621 | 2/1958 | Arnot | 104—34 |
| 2,899,088 | 8/1959 | Corbin | 214—75 |
| 2,904,196 | 9/1959 | Teixeira | 214—84 |
| 2,926,797 | 3/1960 | Decker | 214—38 |
| 3,122,244 | 2/1964 | Corso | 214—84 |

GERALD M. FORLENZA, *Primary Examiner.*

ROBERT G. SHERIDAN, *Examiner.*